No. 790,855. PATENTED MAY 23, 1905.
J. N. SORRELL.
HAY RICKER.
APPLICATION FILED AUG. 1, 1904.

2 SHEETS—SHEET 1.

Witnesses:

Inventor:
James Nelson Sorrell,

By
Attorneys.

No. 790,855. PATENTED MAY 23, 1905.
J. N. SORRELL.
HAY RICKER.
APPLICATION FILED AUG. 1, 1904.

2 SHEETS—SHEET 2.

Witnesses:

Inventor:
James Nelson Sorrell,

By
W. T. Fitzgerald
Attorneys.

No. 790,855. Patented May 23, 1905.

UNITED STATES PATENT OFFICE.

JAMES NELSON SORRELL, OF GREEN CITY, MISSOURI, ASSIGNOR TO G. V. LEHR, GEORGE SHIBLEY, W. O. WILSON, A. E. JONES, AND JOHN SHIBLEY, OF GREEN CITY, MISSOURI.

HAY-RICKER.

SPECIFICATION forming part of Letters Patent No. 790,855, dated May 23, 1905.

Application filed August 1, 1904. Serial No. 219,156.

*To all whom it may concern:*

Be it known that I, JAMES NELSON SORRELL, a citizen of the United States, residing at Green City, in the county of Sullivan and State of Missouri, have invented certain new and useful Improvements in Hay-Rickers; and I do hereby declare the following to be a full, clear, and exact description of the invention, such as will enable others skilled in the art to which it appertains to make and use the same.

My invention relates to a combined hay rake and ricker; and it consists of certain novel features of combination and construction of parts, the preferred form whereof will be hereinafter clearly set forth, and pointed out in the claim.

The prime object of my invention, among others, is to provide a machine which will be reliably efficient in character though consisting of but a few coöperating parts, and therefore very cheaply manufactured and readily assembled in their respective operative positions.

A further object of my invention is to provide means for adjusting my ricker whereby it will readily elevate the straw, hay, or the like to any desired height and there efficiently discharge the same without entanglement or a consequent delay in the work.

Other objects and advantages will be hereinafter made clearly apparent, reference being had to the accompanying drawings, which are made a part of this application, and in which—

Figure 1:
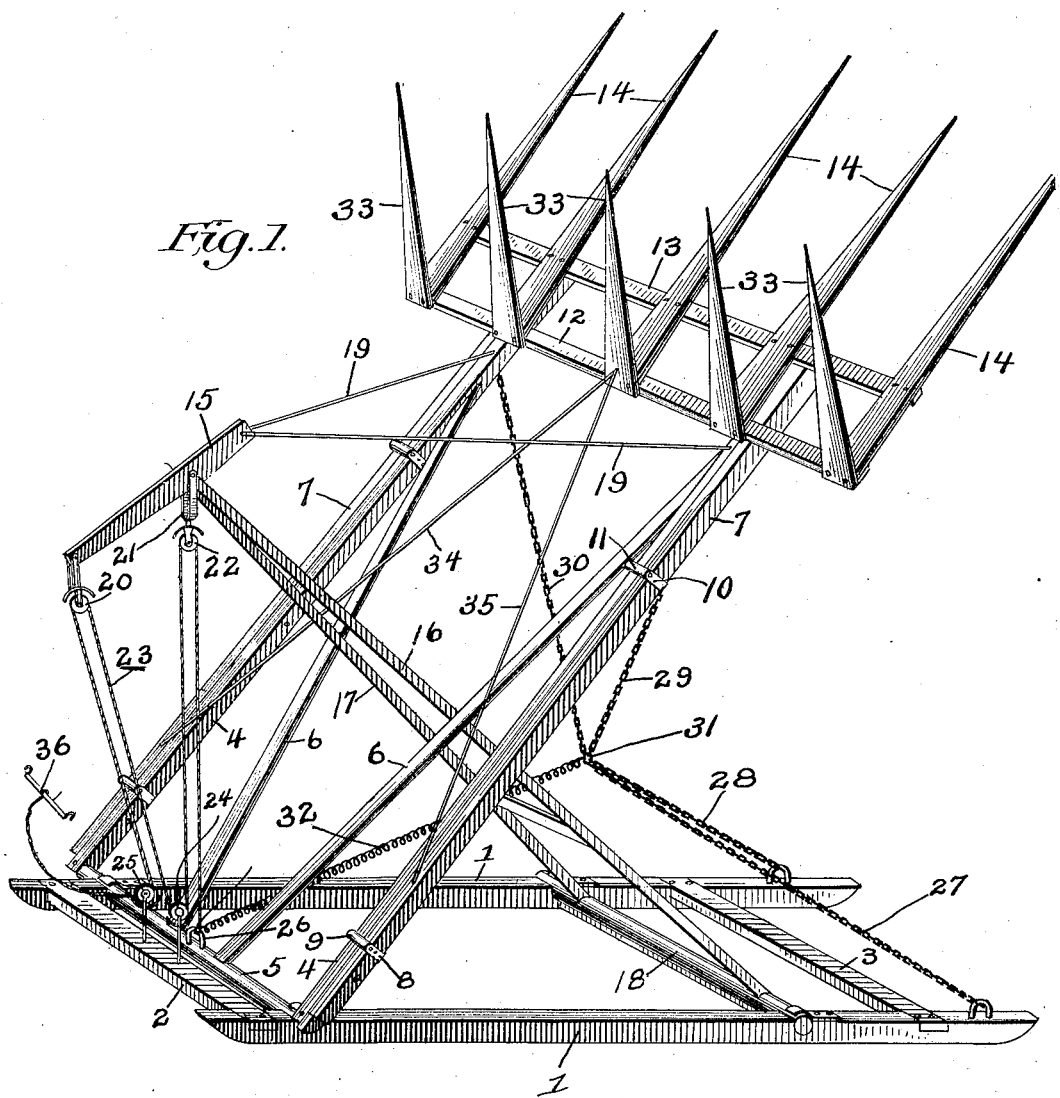
Figure 2:
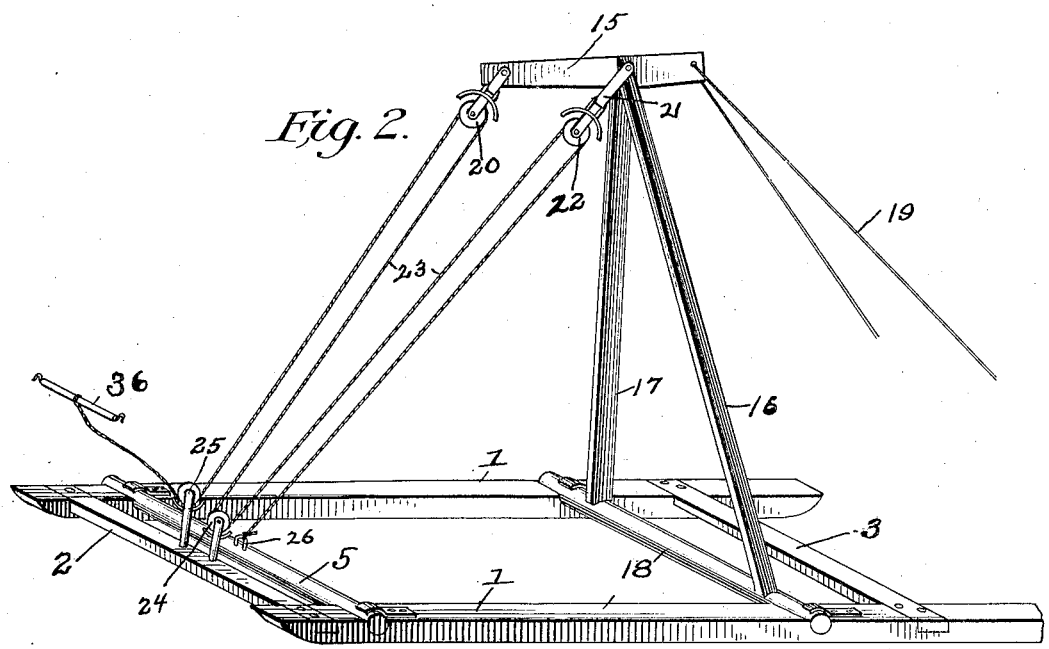
Figure 3:
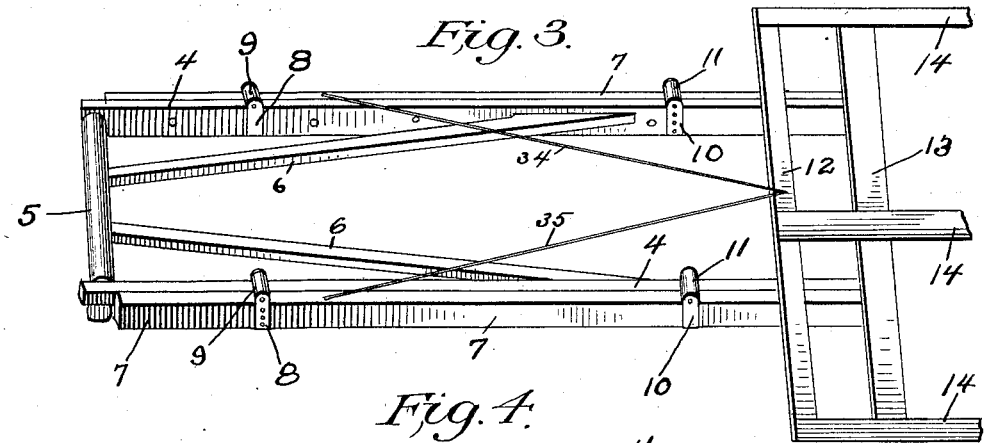
Figure 4:
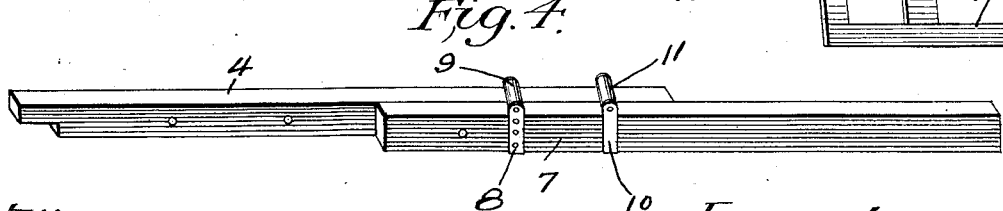

Figure 1 shows a perspective view of my invention complete ready for use. Fig. 2 shows a perspective detail view of a portion of the hoisting apparatus employed by me in lifting the load of hay or the like carried by the fork or rake proper. Fig. 3 is a detail in perspective showing a portion of the rake proper separated from the other parts. Fig. 4 is a detail in perspective showing the telescoping arrangement of the rake-carrying standards, whereby the proper adjustment may be readily effected to deliver the hay or the like to any desired height.

In order to conveniently designate the various details of my invention and coöperating accessories, numerals will be employed, the same numeral applying to a corresponding part throughout the several views.

Referring to the numerals on the drawings, 1 indicates base-sections which in this instance are made substantially in the form of sled-runners and beveled at each end, whereby the other parts of the mechanism disposed thereon may be readily drawn from place to place where it is desired to use the same. The base sections or runners are rigidly and permanently connected together, as by the cross-bars 2 and 3, there being any preferred number of said bars deemed most suitable for the purpose. Upon the supporting-base thus or otherwise constructed I mount certain other coöperating parts, comprising the main or supporting standards 4, which are connected at their lower ends to the outer ends of the roller 5, which latter is secured in suitable seats formed in the end of the runners or base members 1, whereby said roller is left free to turn when the standards 4 are elevated and lowered incident to the operation of the machine. The standards 4 are properly reinforced and sustained by the bracing-sections 6, as more clearly shown in Fig. 1, said braces being connected at their lower ends to the roller 5 and at their upper ends to a contiguous portion of the standards 4.

Designed as being complementary to the standards 4 and arranged to telescope therewith are the auxiliary standards 7, preferably arranged upon the outer side of the standards 4, and are provided at their lower ends with the collar-section 8, having an antifriction-roller 9, said collar being secured to the member 7 in any preferred way. I also provide the collar 10, having the antifriction-roller 11, said collar being secured to the standard 4, and it is therefore obvious that the said parts may be caused to telescope with each other, thereby lengthening the reach of the standards 4, and since the auxiliary standards 7 have secured to their upper ends the cross-bars 12 and 13, to which the rake-teeth 14 are attached, it follows that the rake may be elevated or lowered, as will be hereinafter more particularly set forth.

The standards 4 being pivoted to the base, it becomes desirable at times to elevate the free ends thereof, and with this purpose in view I provide the controlling-lever 15, which is pivotally secured to the upper ends of the inwardly-inclined arms 16 and 17, the lower ends of which are secured to the roller 18, the ends of which are mounted in suitable bearings provided in the runners 1. The short end of the controlling-lever 15 is pivotally connected with each of the standards 4, near the outer ends thereof, by means of the rods 19, as clearly set forth in Fig. 1. The longer end of the lever 15 is provided with the pulley-wheel 20, secured to said end in any preferred way, while at the pivot-point of the lever 15 I also secure the U-shaped depending yoke 21, the lower end of which carries the pulley 22, said pulleys being designed to receive the controlling rope or cable 23. The cable 23 also passes around the pulleys 24 and 25, while the inner end of the cable is connected to the anchoring-staple 26, to the roller 5, or a contiguous part of the frame, while the pulleys 24 and 25 are attached in suitable bearings or supports to the cross-bar 2, connecting the runners together, as hereinbefore described.

In order to limit the upward movement of the standards 4 and the rake carried thereby, so that said parts will not pass beyond a vertical plane extending through the roller 5, I provide the stay-chains 27, 28, 29, and 30, joined together near their middle portions by a common link 31, and it is therefore obvious that the extent of the upward movement of the rake will be determined by the length of said chains. I also provide the retracting-spring 32, which is connected to the link 31 and to the staple 26, the office of said spring being to start said standards 4 on their downward movement and also to take up the slack in the chains when the rake is in a lowered position, thereby holding said chains off of the ground. I also provide a plurality of auxiliary teeth 33, extending at right angles to the teeth 14, said auxiliary teeth being designed to hold the hay or the like from falling down upon the other operating parts of the rake. Suitable bracing rods or members 34 and 35 are also provided to connect the rake proper with the auxilary standards 7, inasmuch as the rake itself is secured to the free ends of said auxiliary standards, thus making it necessary that the bracing-rods 34 and 35 shall move therewith.

By the arrangement of pulleys hereinbefore described the cable, being first secured to the anchoring-staple 26, is passed around the pulley 22 and thence extended downward around the pulley 24 and upward over the pulley 20, and finally under the pulley 25, the free end of the cable being provided with a swingletree, as indicated by the numeral 36, whereby a horse or other draft-animal may be attached to the cable and insure that with the expenditure of a minimum amount of force the rake, with its heavy load of hay or the like, may be very easily elevated to the desired point upon the top of the rick or stack.

It is obvious that when the rake is lowered the teeth 14 will be a proper distance above the surface of the ground to insure that the hay will be gathered by said teeth, and while my rake may be so employed to take up the hay as it falls after the mowing-machine it will be especially desirable for taking up windrows of hay, inasmuch as a heavy load may be secured upon the teeth 14. When the rake proper shall have been sufficiently loaded, as by drawing the machine over the ground on a line with the windrow, the machine is then drawn to the rick or stack and the animal attached to the swingletree 36, which will cause the elevation of the rake, with its accompanying load, to a point where said load will be discharged in the proper position, thus enabling a great mass or load of hay or the like to be placed bodily upon the top of the rick or stack ready to be properly disposed of by the person or persons thereon.

While I have described the preferred combination and construction of parts deemed necessary in materializing my invention, I desire to comprehend such substantial equivalents and substitutes as may be considered as falling fairly within the scope of my invention.

It will be seen from the foregoing specification, considered in connection with the accompanying drawings, that I have provided a very simple, though reliably efficient, machine for the purpose of taking up and handling heavy loads of hay at the expense of a minimum amount of labor, and believing that the advantages and manner of using my invention have thus been made clearly apparent further description is deemed unnecessary.

Having thus fully described my invention, what I claim as new, and desire to secure by Letters Patent, is—

The herein-described ricker for hay or the like, comprising a suitable base-section, standards arranged upon said base-section and auxiliary standards coöperating with the main standards, in combination with a rake carried by the auxiliary standards, arms 16 and 17, a lever pivotally mounted upon the upper ends of said arms, means to connect the short end of said lever with said standards, a cable and a system of pulleys coöperating with the long end of said lever adapted to lift or lower the rake, means to limit the upward movement of said standards and to start the same upon their downward course comprising stay-chains, the ends of which are secured respectively to the runners and the standards, a link intersecting said chains at substantially their central portion, and a retracting-spring 32 one end of which is secured to said link and the opposite end to a portion of the frame whereby, when the standards are elevated, the upward movement of the same will be limited and said standards started on their downward course by the action of said spring upon said stay-chains when the draft-power has been released from the cable 23, substantially as and for the purpose set forth.

In testimony whereof I have signed my name to this specification in the presence of two subscribing witnesses.

JAMES NELSON SORRELL.

Witnesses:
J. H. QUIGLEY,
JOHN SHIBLEY.